(12) United States Patent
Kaushal et al.

(10) Patent No.: US 7,553,150 B2
(45) Date of Patent: Jun. 30, 2009

(54) VALVE-PIN ACTUATING DEVICE FOR A HOT RUNNER APPARATUS

(75) Inventors: Hitesh Kaushal, Brampton (CA); Murray Feick, Kitchener (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 196 days.

(21) Appl. No.: 11/764,845

(22) Filed: Jun. 19, 2007

(65) Prior Publication Data

US 2007/0290406 A1 Dec. 20, 2007

Related U.S. Application Data

(60) Provisional application No. 60/814,548, filed on Jun. 19, 2006.

(51) Int. Cl.
B29C 45/23 (2006.01)

(52) U.S. Cl. .................................. 425/564; 425/566

(58) Field of Classification Search ............... 425/562, 425/563, 564, 565, 566, 576
See application file for complete search history.

(56) References Cited

U.S. PATENT DOCUMENTS

| | | | |
|---|---|---|---|
| 2,828,507 A | 4/1958 | Strauss | |
| 2,865,050 A | 12/1958 | Strauss | |
| 2,878,515 A | 3/1959 | Strauss | |
| 3,671,159 A | 6/1972 | Greenberg et al. | |
| 4,212,627 A * | 7/1980 | Gellert | 425/564 |
| 4,330,258 A | 5/1982 | Gellert | |
| 4,613,475 A * | 9/1986 | Hettinga | 425/574 |
| 4,923,387 A * | 5/1990 | Gellert | 425/566 |
| 5,066,216 A | 11/1991 | Kowtko et al. | |
| 5,512,223 A * | 4/1996 | Morikita | 425/566 |
| 6,113,381 A | 9/2000 | Gellert et al. | |
| 6,398,542 B1 | 6/2002 | Romanski et al. | |
| 6,755,641 B1 | 6/2004 | Nakanishi | |
| 7,086,852 B2 | 8/2006 | Nakanishi | |
| 7,131,834 B2 | 11/2006 | Babin et al. | |
| 7,210,922 B1 | 5/2007 | Kohler | |
| 7,217,384 B2 | 5/2007 | Tanaka et al. | |

FOREIGN PATENT DOCUMENTS

| | | |
|---|---|---|
| DE | 1124234 B1 | 2/1962 |
| DE | 4034934 C2 | 5/1992 |
| DE | 19611880 A1 | 10/1997 |
| DE | 19943797 A1 | 3/2001 |

(Continued)

*Primary Examiner*—Tim Heitbrink
(74) *Attorney, Agent, or Firm*—Medler Ferro PLLC

(57) ABSTRACT

A valve pin actuating device for a hot runner apparatus includes a yoke plate coupled to actuators. The actuators are generally disposed at the ends of the yoke plate and are configured to move the yoke plate in a direction parallel to a longitudinal axis of the valve pins. A deflection distributor apparatus is coupled to the yoke plate. The deflection distributor apparatus is connected to a first force distributor plate, to which the valve pins are connected. The deflection distributor apparatus includes a second force distributor plate and a third force distributor plate. Rods are disposed between the yoke plate and the third force distributor plate, between the third force distributor plate and the second force distributor plate, and between the second force distributor plate and the first force distributor plate holding the valve pins.

17 Claims, 6 Drawing Sheets

FOREIGN PATENT DOCUMENTS

| | | |
|---|---|---|
| JP | 1-97924 | 1/1989 |
| JP | 8174605 A | 7/1996 |
| JP | 11-254487 A | 9/1999 |
| JP | 2001-105458 A | 4/2001 |
| JP | 2002-096359 A | 4/2002 |
| KR | 10-0655750 B2 | 12/2006 |
| WO | WO 2006-080807 A1 | 8/2006 |

* cited by examiner

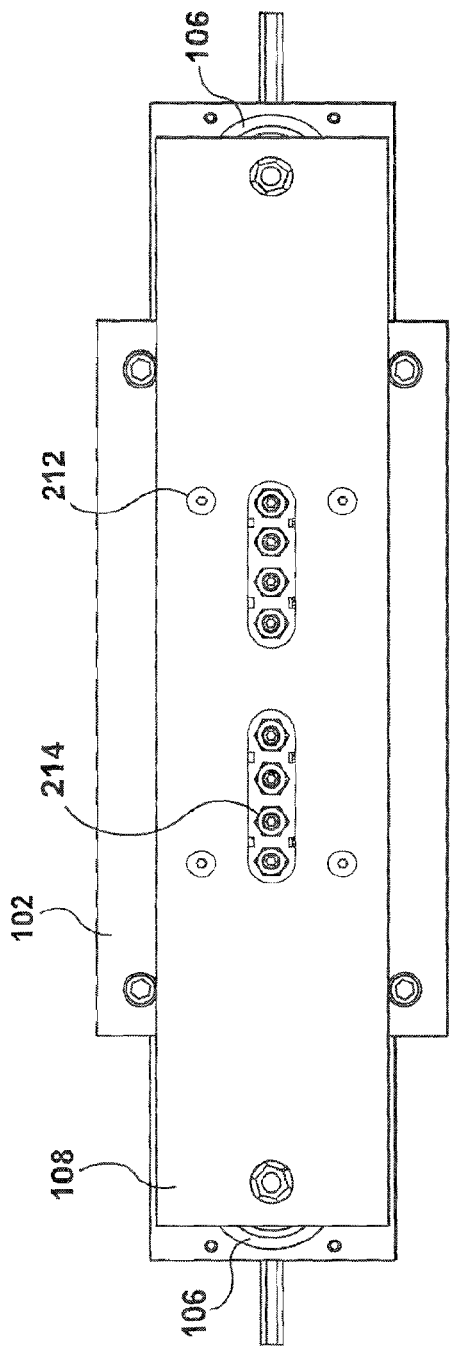
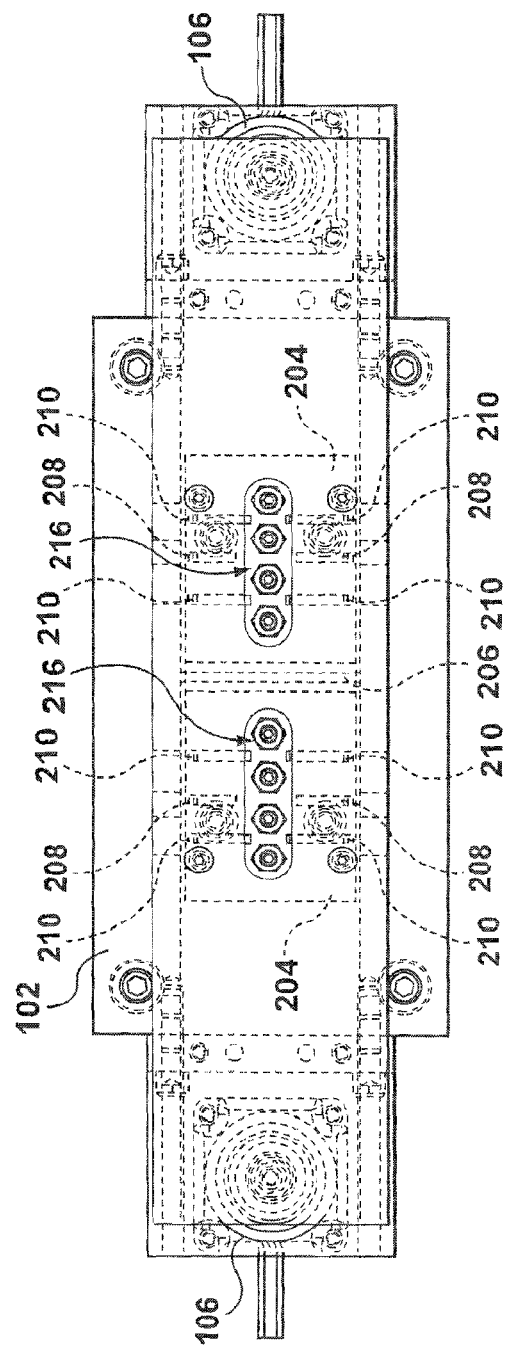

VALVE-PIN ACTUATING DEVICE FOR A HOT
RUNNER APPARATUS

CROSS-REFERENCE TO RELATED APPLICATION

This application claims the benefit of U.S. provisional patent application No. 60/814,548 filed Jun. 19, 2006, which is hereby incorporated by reference in its entirety herein.

BACKGROUND OF THE INVENTION

1. Field of the Invention

This invention is relates to an injection molding hot runner nozzle valve pin actuating apparatus, more particularly an actuating apparatus which simultaneously actuates a plurality of valve pins.

2. Related Art

In injection molding, when melt material is delivered to one or more mold cavities, it is sometimes desired to simultaneously actuate the valves of a plurality of nozzles that regulate the flow of the melt. This can be the case when there are many nozzles each serving its own cavity or when many nozzles serve one cavity.

An injection molding apparatus can include an array of nozzles that have valves that are simultaneously actuated via a yoke plate that is connected to one or more actuators; this is particularly useful in small pitch applications where there is not enough room between nozzles to accommodate individual actuators for each nozzle. One problem that can occur with this type of apparatus is yoke plate deflection caused by pressurized melt in the mold cavity pushing back on valve pins. This can result in larger than acceptable witness marks on the finished product or back-leakage of melt material from the cavity. This problem can affect any kind of injection molding where yoke plates are used.

Conventional solutions to yoke plate deflection include thickening the yoke plate. However, thickening the yoke plate adds to the stack height of the injection molding apparatus and adds significant cost to the injection molding apparatus.

SUMMARY OF THE INVENTION

In an embodiment of the present invention, a valve pin actuating device for a hot runner apparatus includes a yoke plate coupled to actuators. The actuators are generally disposed at the ends of the yoke plate and are configured to move the yoke plate in a direction parallel to a longitudinal axis of the valve pins. The valve pins are coupled to a first force distributor plate. A deflection distributor apparatus is coupled to the yoke plate and disposed between the yoke plate and the first force distributor plate. The deflection distributor apparatus includes a second force distributor plate and a third force distributor plate. Rods are disposed between the yoke plate and the third force distributor plate, between the third force distributor plate and the second force distributor plate, and between the second force distributor plate and the first force distributor plate holding the valve pins.

In another embodiment of the present invention, a valve pin actuating device includes a yoke plate connected to actuators and movable with respect to a mold clamp plate by the actuators. A plurality of force distributor plates are connected to the yoke plate and a plurality of valve pins are connected to the force distributor plates. Rods form a bearing connection between the yoke plate and the force distributor plates.

BRIEF DESCRIPTION OF THE FIGURES

Embodiments of the present invention will now be described more fully with reference to the accompanying drawings where like reference numbers indicate similar structure.

FIG. 3 is a top view of the mold assembly of FIG. 1 without hidden lines shown.

FIG. 4 is a top view of the mold assembly of FIG. 1 with hidden lines shown.

DETAILED DESCRIPTION OF THE INVENTION

Figure 1:
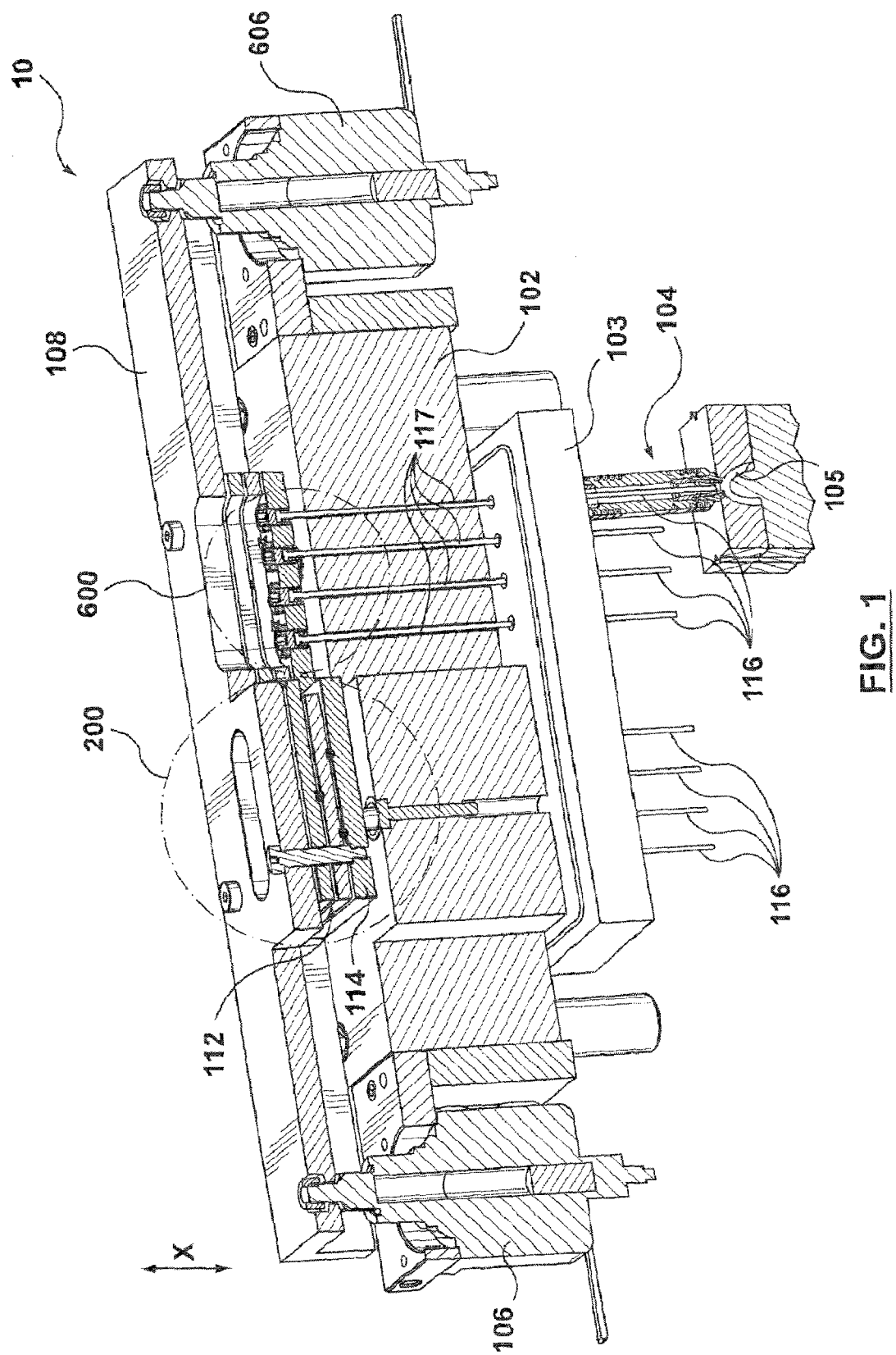
FIG. 1 is a perspective cross-sectional view of a mold assembly according to a first embodiment of the invention.

FIG. 1 shows a mold assembly 10 according to a first embodiment of the invention. The mold assembly 10 comprises a mold clamp plate or back plate 102, below which a conventional mold plate can be disposed, such mold plate holding a manifold 103 fixed with respect to the back plate 102 and an array of nozzles 104 (only one shown for clarity) connected to the manifold 103 to deliver melt to a mold cavity or cavities 105. As would be apparent to one of ordinary skill in the art, such a manifold 103 conventionally includes a manifold channel that delivers melt from a sprue to nozzle channels in the nozzles 104, through mold gates, and into the mold cavity or cavities 105. In addition, FIG. 1 omits other, well-known components such as additional mold pates, alignment pins, bolts, etc for clarity. At each end of the mold clamp plate 102 is an actuator assembly 106 that can comprise a linear electric actuator, a hydraulic actuator, a pneumatic actuator, or any other actuator known in the art. The actuator assemblies 106 are connected to and adapted to move a yoke plate 108 up and down along an axis X. Connected to the yoke plate 108 is a deflection distributor apparatus 112, which is connected to a first force distributor plate 114. The first force distributor plate 114 has valve pins 116 connected thereto, such valve pins 116 running through holes 117 in the mold clamp plate 102 and controlling the flow of melt from the tips of the nozzles 104 to the mold cavity or cavities 105. The first embodiment has eight valve pins 116, yet any amount is acceptable. The deflection distributor apparatus 112 transfers force from the yoke plate 108 to the first force distributor plate 114 such that when the actuator assemblies 106 move the yoke plate 108 up along the axis X the first force distributor plate 114 moves the valve pins 116 up likewise, and when the actuator assemblies 106 move the yoke plate 108 down along the axis X the first force distributor plate 114 moves the valve pins 116 down likewise. In this way, the actuator assemblies 106 can be used to control the flow of melt through the nozzles 104 into the cavity or cavities 105, and can do so in a synchronized manner. When hydraulic or pneumatic actuator assemblies are selected, the first force distributor plate 114 can act as a stop against the mold clamp plate 102. This may be unnecessary when the actuator assemblies 106 are selected to comprise linear electric actuators.

Figure 2:
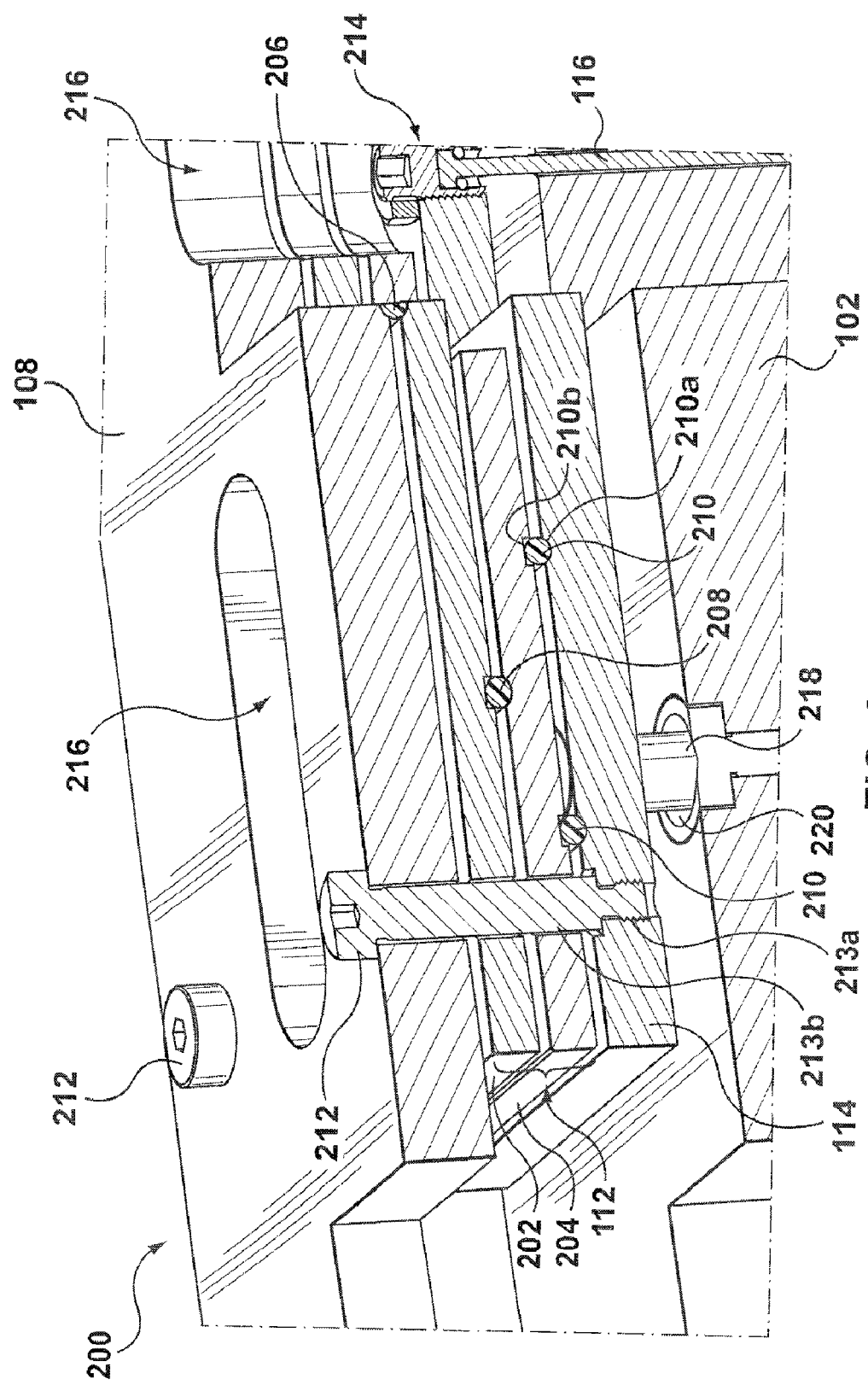
FIG. 2 shows a close-up partial sectional view 200 of the deflection distributor apparatus of the mold assembly of FIG. 1.

FIG. 2 shows a close-up view 200 of a portion (as indicated in FIG. 1) of the deflection distributor apparatus 112. The deflection distributor apparatus 112 includes a second force distributor plate 204, a third force distributor plate 202, an upper rod 206, two middle rods 208, and four lower rods 210. The third force distributor plate 202 can serve to compensate for any tilt of the yoke plate 108 between the actuator assemblies 106, and as such the third force distributor plate 202 can be omitted, if such tilt does not exist or can be neglected. The upper rod 206 provides a bearing connection between the yoke plate 108 and the third force distributor plate 202. The middle rods 208 provide a bearing connection between the third force distributor plate 202 and the second force distributor plate 204. Likewise, the lower rods 210 provide a bearing connection between the second force distributor plate 204 and the first force distributor plate 114. The rods are positioned in rod locating grooves 210a and 210b located on the plates 202, 204, 114. The rod locating grooves 210a and 210b can have rounded, rectangular, or other cross-sections.

A bolt 212 or other means for connecting is further provided to keep the plates 108, 202, 204, 114 sandwiched together. The bolt 212 is threaded on a narrowed portion 213a at the tip to mate with the force distributor plate 114. The remainder of the bolt 212 comprises an unthreaded wider portion 213b. This allows for easier assembly and disassembly of the bolt 212 and plates 108, 202, 204, 114. It should be noted that the bolts 212 mainly act to keep the plates 108, 202, 204, 114 sandwiched together (e.g., during assembly or when the yoke plate 108 moves up), and are not required to carry any appreciable load when the yoke plate 108 moves down. Any number of bolts 212 can be used.

Further shown in FIG. 2 is one of the valve pins 116. It can be seen that the head of the valve pin 116 is flattened. The head of the valve pin 116 is coupled to the valve pin adjustment device 214, which can be used to adjust the height of the valve pin 116. The end (not shown) of the valve pin 116 opposite the flattened end is for regulating the flow of melt in the respective nozzle 104, as known in the art.

To provide access to the valve pin adjustment device 214, the yoke plate 108, the third force distributor plate 202, and the second force distributor plate 204 have holes that form access openings 216. An operator can use an access opening 216 to adjust the valve pin adjustment devices 214 so as to adjust the heights (along axis X) of the valve pins 116 without disassembly of the mold assembly 10.

FIG. 2 also shows a guide rod 218 connected to the bottom of the first force distributor plate 114 and a guide hole 220 disposed in the mold clamp plate 102. The guide rod 218 mates with the guide hole 220 and is for preventing the first force distributor plate 114 from shifting with respect to the mold clamp plate 102. In this embodiment four mating sets of guide rods 218 and guide holes 220 are provided, although more or fewer are acceptable.

FIG. 3 and FIG. 4 show top views of the mold assembly 10 without hidden lines and with hidden lines, respectively. As shown in FIG. 4, rods 208, 210 are disposed on either side of the access openings 216. Were the access openings to be eliminated, the rods 208, 210 could be single continuous rods like the rod 206. In addition, FIG. 4 shows two second force distributor plates 204. Alternatively, one longer plate can be used.

Figure 5:
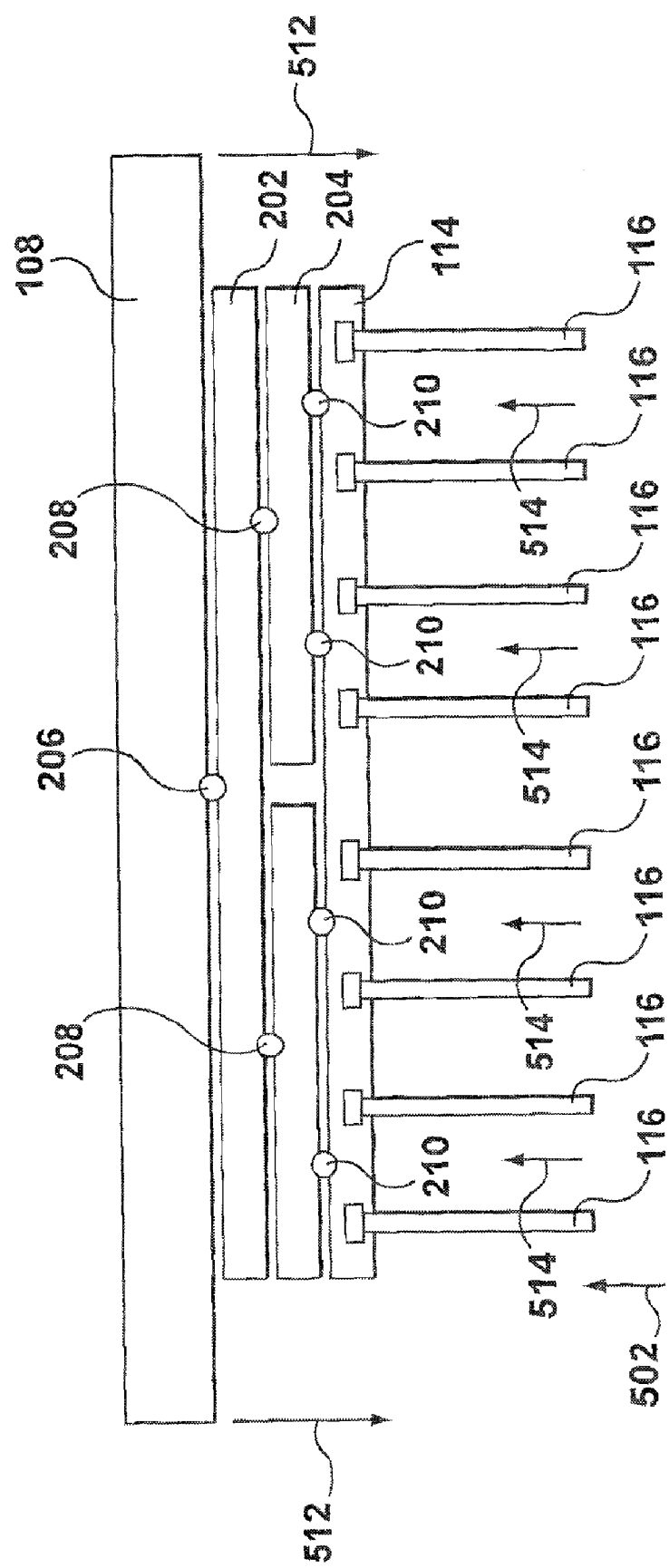
FIG. 5 is simplified side cross-sectional view of the mold assembly of FIG. 1.

Referring to FIG. 5, a simplified side cross-sectional view of the mold assembly 10 is illustrated. When the valve pins 116 are positioned to close the valves, back-pressure from the mold cavity 105 pushes the valve pins 116 in a direction 502. Forces on the yoke plate 108 from the actuator assemblies are shown by arrows 512. The forces from the back pressure on the valve pins act against the forces 512. In a conventional configuration, wherein the valve pins are coupled to the yoke plate, bending of the yoke plate due to the forces acting on the ends of the yoke plate and forces from the valve pins causes yoke plate 108 to deflect into an arc type shape, thereby causing the valve pins of equal length to extend to different heights and to be other than vertical. In the embodiment shown in FIG. 5, the forces from the valve pins are transferred to the second force distributor plates 204 through the lower rods 210 and to the third force distributor plate 202 through the middle rods 208. Similarly, these forces are transferred to the yoke plate 108 via the upper rod 206. The arrangement of rods 206, 208, 210 and plates 108, 202, 204, 114 and valve pins 116 prevents deflection of the first force distributor plate 114, which ensures that the desired closure of all the valves can be attained. Whether or not the yoke plate 108 or second and third force distributor plates 204, 202 flex is unimportant since the first force distributor plate 114 remains substantially flat. When the valve pin adjustment device 214 of each valve pin 116 is properly adjusted, witness marks on the end product(s) can be minimized and/or made uniform, i.e., no abnormally large witness marks due to deflection of the yoke plate 108 or other plates. As can be seen by the arrows 514, the forces on the first force distributor plate 114 are substantially equal over the length of the first force distributor plate 114, and the corresponding forces on the valve pins 116 are acceptably uniform (i.e., are not so different as to cause a problem).

Figure 6:
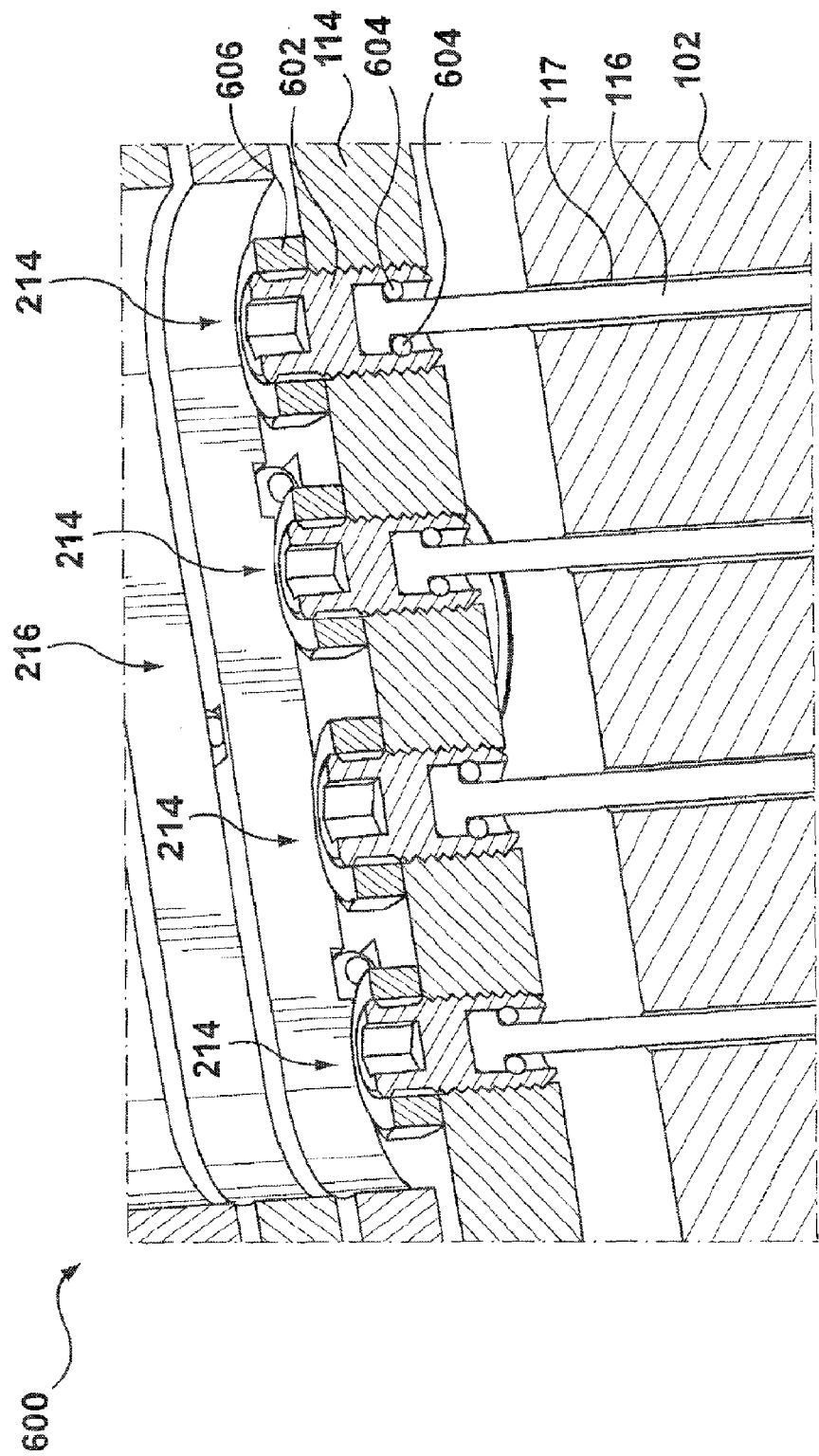
FIG. 6 is a close-up cross-sectional view 600 of four of the valve pin adjustment devices of FIG. 1.

FIG. 6 illustrates a close-up view 600 of a portion (as indicated in FIG. 1) of four of the valve pin adjustment devices 214. Each valve pin adjustment device 214 comprises a valve pin holder 602, two dowel pins 604, and a lock nut 606. The valve pin holder 602 has a recess for receiving the flattened head portion of the valve pin 116. The valve pin 116 is secured in the valve pin holder 602 by dowel pins 604. The valve pin holder 602 has an external thread that mates with a thread in the force distributor plate 114. The height of the valve pin holder 602 and thus the height of the valve pin 116 and the closing position at the nozzle tip end can be adjusted by turning the valve pin holder 602 in the thread. When a desired height is achieved, the lock nut 606 can be threaded onto the thread of the valve pin holder 602. At any time, an operator can, via an access opening 216, adjust heights of the valve pins 116 by way of the lock nuts 606 and threaded valve pin holders 602.

The yoke plate 108, third force distributor plate 202, second force distributor plate 204, first force distributor plate 114, and rods 206, 208, 210 may be made from any material suitable for use in an injection molding apparatus environment, for example, tool steel.

In other embodiments, more or fewer actuator assemblies 106 can be used. The number of force distributor plates 202, 204 and the respective pins can also be increased or decreased depending on requirements. Likewise, the number of valve pins 116 can be changed to suit any type of molding application.

Figure 7:
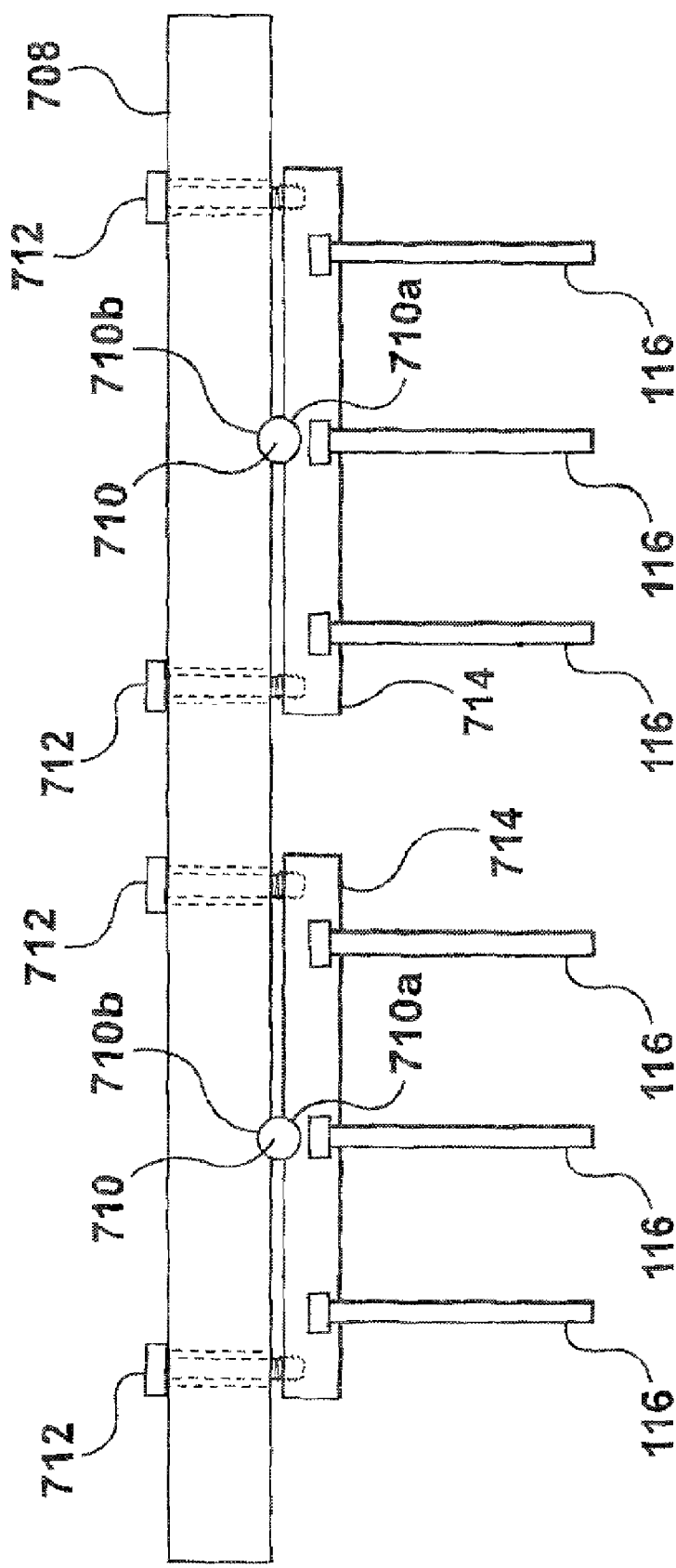
FIG. 7 is simplified side cross-sectional view of another embodiment of the present invention.

FIG. 7 illustrates another embodiment of the present invention in simplified form, which may be used in a mold assembly, such as the mold assembly 10 previously described. Components, aspects, and advantages of the other embodiments also apply to this embodiment.

A yoke plate 708 and force distributor plates 714 are coupled by rods 710 that sit in rod locating grooves 710a, 710b. The rods 710 provide a bearing connection between the yoke plate 708 and the force distributor plates 714. Bolts 712 or other means for connecting are provided to keep the force distribution plates 714 coupled to the yoke plate 708. To this end, the bolts 712 are threaded into threaded bores of the force distribution plates 714, but pass through wider, unthreaded bores in the yoke plate 108. Therefore, the bolts 712 mainly act to keep the force distribution plates 714 coupled to the yoke plate 108 (e.g., during assembly or when the yoke plate 108 moves up), and are not required to carry any appreciable load when the yoke plate 108 moves down. Valve pins 116 are connected to the force distributor plates 714 and can be moved up and down via actuators (e.g., actuator assemblies 106) connected to the yoke plate 708. Any number of bolts 712 can be used.

It can be seen from FIG. 7 that the valve pins 116 will likely not all have the same force because of their different locations on the force distributor plates 714. However, the rods 710 and force distributor plates 714 do make the forces in the valve pins 116 more uniform than they would be with only a yoke plate, as in the prior art. This is because the geometry makes the forces in the rods 710 approximately equal. As a result, the forces on the valve pins 116 are acceptably uniform (i.e., are not so different as to be problematic). If such level of uniformity is acceptable for a given application, then this embodiment has the advantage of a reduced number of parts.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold having at least one manifold melt channel for receiving a melt stream of moldable material under pressure;
   a plurality of nozzles, each nozzle including a nozzle melt channel in fluid communication with said manifold melt channel;
   a plurality of mold gates, each mold gate being disposed in communication with one of said nozzle melt channels and leading to a mold cavity or plurality of mold cavities;
   a plurality of valve pins, each valve pin being disposed at least partially within one of said plurality of nozzles;
   a yoke plate coupled to actuators, wherein said yoke plate and actuators are configured to move said yoke plate in a direction parallel to a longitudinal axis of the valve pins, wherein when said yoke plate is moved, said valve pins move;
   a first force distributor plate coupled to an end of said valve pins;
   a second force distributor plate disposed between said first force distributor plate and said yoke plate; and
   a first plurality of rods disposed between said first force distributor plate and said second force distributor plate.

2. The injection molding apparatus of claim 1, further comprising:
   a third force distributor plate disposed between said second force distributor plate and said yoke plate; and
   a second plurality of rods disposed between said second force distributor plate and said third force distributor plate.

3. The injection molding apparatus of claim 2, further comprising a third rod disposed between said third force distributor plate and said yoke plate.

4. The injection molding apparatus of claim 3, wherein said third rod is disposed in a groove disposed in a back surface of said third force distributor plate and a front surface of said yoke plate.

5. The injection molding apparatus of claim 2, wherein said second plurality of rods are disposed in grooves disposed in a back surface of said second force distributor plate.

6. The injection molding apparatus of claim 1, wherein said first plurality of rods are disposed in grooves disposed in a back surface of said first force distributor plate and a front surface of said second force distributor plate.

7. The injection molding apparatus of claim 1, wherein said second force distributor plate comprises a plurality of plates aligned horizontally adjacent to each other.

8. An apparatus for moving a plurality of valve pins in an injection molding apparatus comprising:
   a yoke plate coupled to actuators, wherein said yoke plate and actuators are configured to move said yoke plate in a direction parallel to a longitudinal axis of the valve pins, wherein when said yoke plate is moved in a first direction, the valve pins move in the first direction and when said yoke plate is move in a second direction, the valve pins move in the second direction;
   a first force distributor plate coupled to an end of said valve pins;
   a second force distributor plate disposed between said first force distributor plate and said yoke plate; and
   a first plurality of rods disposed transverse to said longitudinal axis and between said first force distributor plate and said second force distributor plate.

9. The apparatus of claim 8, further comprising:
   a third force distributor plate disposed between said second force distributor plate and said yoke plate; and
   a second plurality of rods disposed between said second force distributor plate and said third force distributor plate.

10. The apparatus of claim 9, further comprising a third rod disposed between said third force distributor plate and said yoke plate.

11. The apparatus of claim 10, wherein said third rod is disposed in a groove disposed in a back surface of said third force distributor plate and a front surface of said yoke plate.

12. The apparatus of claim 9, wherein said second plurality of rods are disposed in grooves disposed in a back surface of said second force distributor plate.

13. The apparatus of claim 8, wherein said first plurality of rods are disposed in grooves disposed in a back surface of said first force distributor plate and a front surface of said second force distributor plate.

14. The apparatus of claim 8, wherein said second force distributor plate comprises a plurality of plates aligned horizontally adjacent to each other.

15. An injection molding apparatus, comprising:
   a manifold fixed with respect to a mold clamp plate for conveying melt;
   a plurality of nozzles connected to the manifold for delivering melt from the manifold to at least one cavity;
   a plurality of actuators connected to the mold clamp plate;
   a yoke plate connected to the actuators and movable with respect to the mold clamp plate by the actuators;
   at least two force distributor plates, the yoke plate having a planar surface opposed to a planar surface of at least one of said force distributor plates;

at least two rods, each rod positioned parallel to said planar surfaces and forming a bearing connection between the yoke plate and one of the force distributor plates;

means for connecting the force distributor plates with the yoke plate; and a plurality of valve pins connected to the force distributor plates for controlling flow of melt in the nozzles.

16. The injection molding apparatus of claim 15, wherein the yoke plate and force distributor plates have grooves for locating the rods.

17. The injection molding apparatus of claim 15, wherein the means for connecting comprises bolts threaded to each force distributor plate but not threaded to the yoke plate.

* * * * *